United States Patent [19]
Witzel et al.

[11] Patent Number: 4,712,953
[45] Date of Patent: Dec. 15, 1987

[54] METHOD AND APPARATUS FOR ALIGNING CUTTING TOOLS

[75] Inventors: John R. Witzel, Goshen; Paul J. Weisgerber, Cincinnati, both of Ohio

[73] Assignee: Cincinnati Milacron Inc., Cincinnati, Ohio

[21] Appl. No.: 16,414

[22] Filed: Feb. 19, 1987

[51] Int. Cl.$^4$ .................. B23B 39/06; B23Q 15/24
[52] U.S. Cl. ...................... 409/131; 33/286; 33/DIG. 21; 356/153; 408/8; 408/13; 408/16; 408/1 R; 409/208
[58] Field of Search .............. 33/286, 645, 655, 657, 33/DIG. 21; 356/153; 364/474; 408/16, 1 R, 8, 10, 11, 13; 409/131, 132, 207, 208, 210, 214, 218

[56] References Cited
U.S. PATENT DOCUMENTS

| | | | |
|---|---|---|---|
| 3,713,746 | 1/1973 | Luthy | 408/16 X |
| 4,003,133 | 1/1977 | Pierik | 33/286 X |
| 4,566,226 | 1/1986 | Kimura | 408/16 X |
| 4,585,379 | 4/1986 | Nagayama et al. | 409/207 X |
| 4,669,927 | 6/1987 | Zeller | 364/474 X |

FOREIGN PATENT DOCUMENTS
8590 1/1977 Japan ....................... 408/16

Primary Examiner—Gil Weidenfeld
Assistant Examiner—Steven C. Bishop
Attorney, Agent, or Firm—Thomas M. Farrell; Frank C. Leach

[57] ABSTRACT

Bore holes are formed in opposite side walls of a part in alignment with each other by two separate cutting tools in two separate machine tools disposed on opposite sides of the part. One of the machine tools is a master and the other is a slave with the master machine tool being disposed at the position at which it is to form a bore hole in one of the opposite side walls. Then, the slave machine tool is moved so that the longitudinal axis of its spindle is in alignment with the longitudinal axis of the spindle of the master machine tool whereby the two bore holes will be aligned with each other and extend through the entire part. This alignment is accomplished by a laser on a spindle carrier of the master machine tool producing a laser beam in parallel with the longitudinal axis of the spindle of each of the spindle carriers and being received by a laser target on the spindle carrier of the slave machine tool.

20 Claims, 13 Drawing Figures

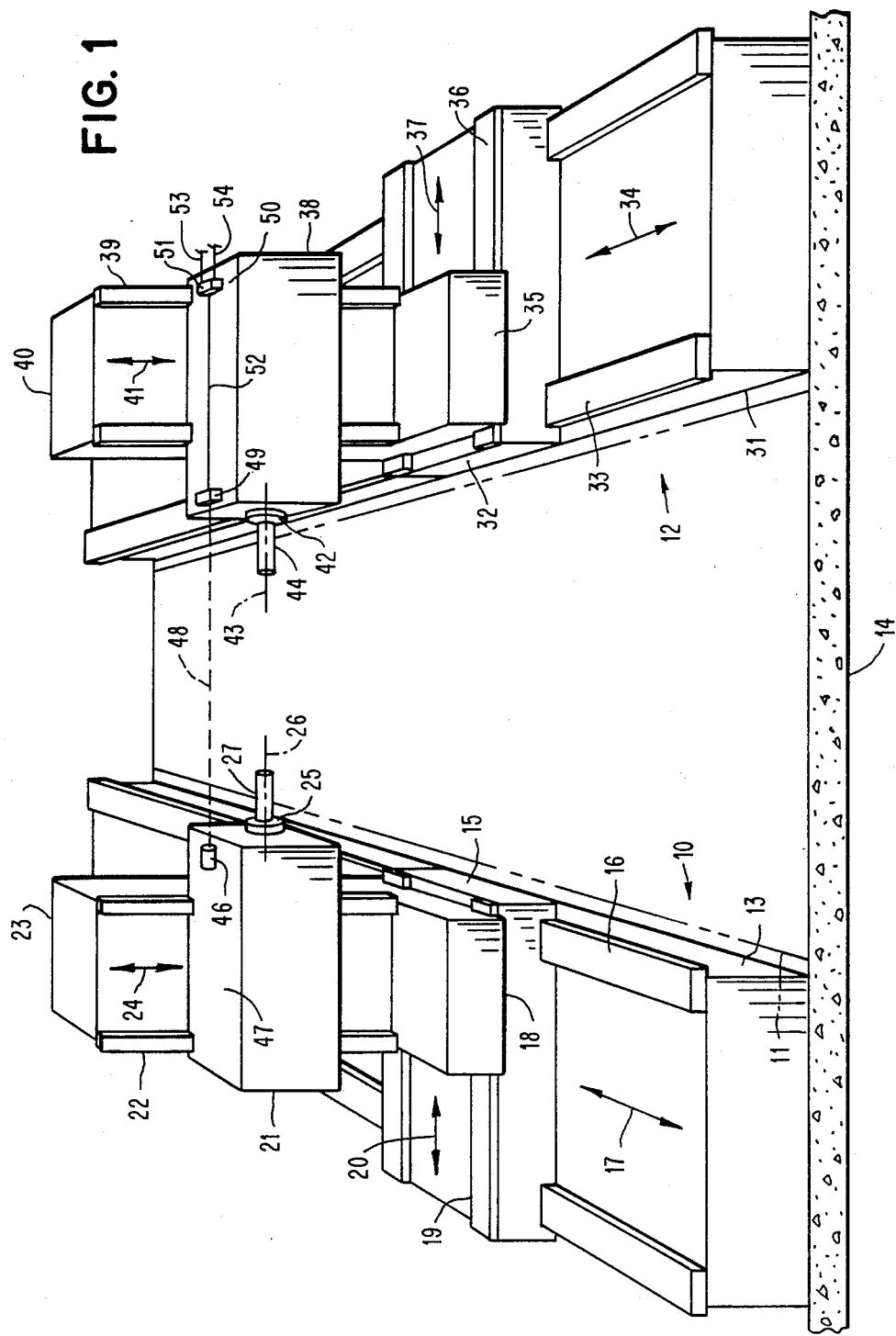

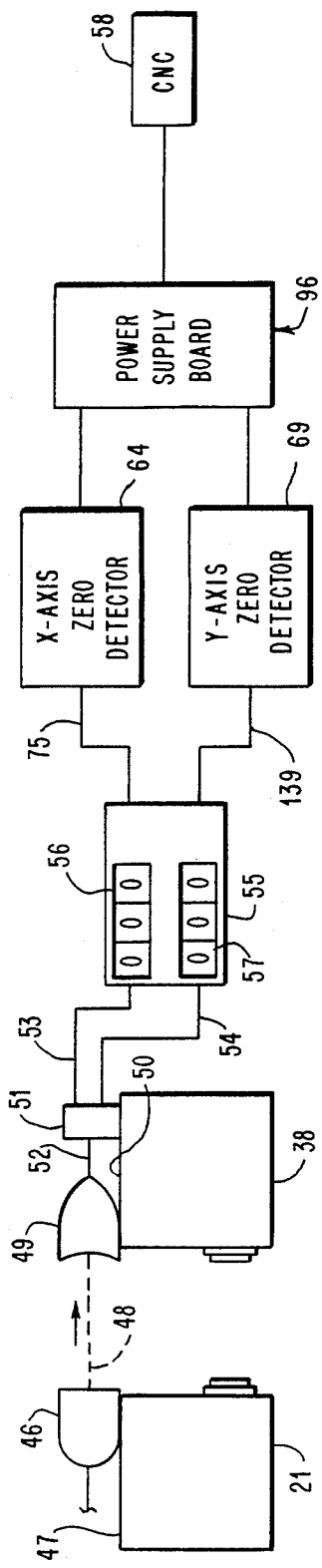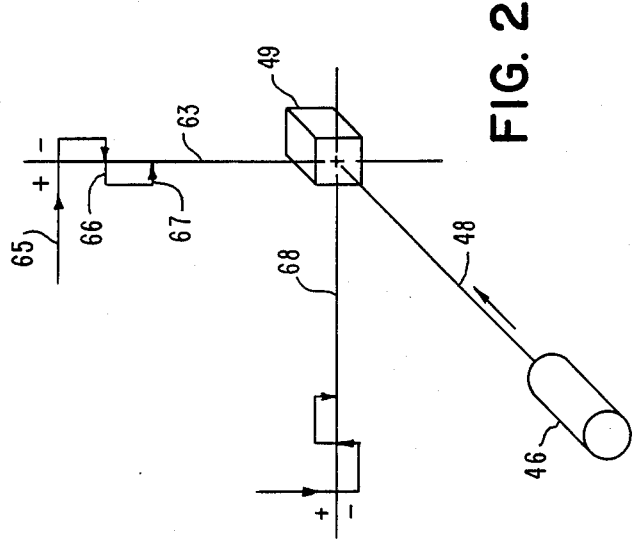
FIG. 3
FIG. 2

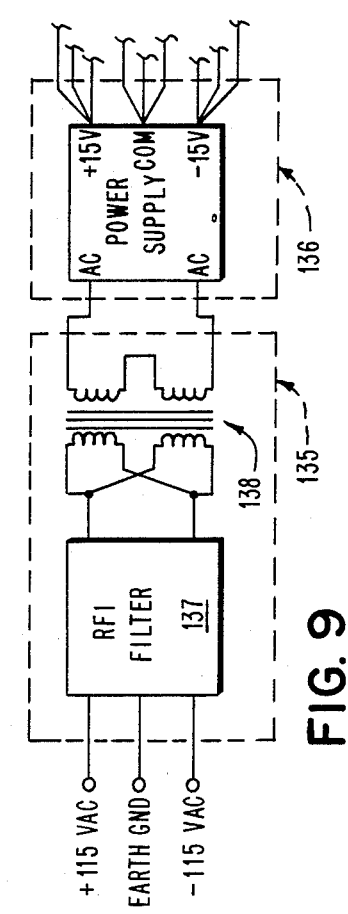
FIG. 11
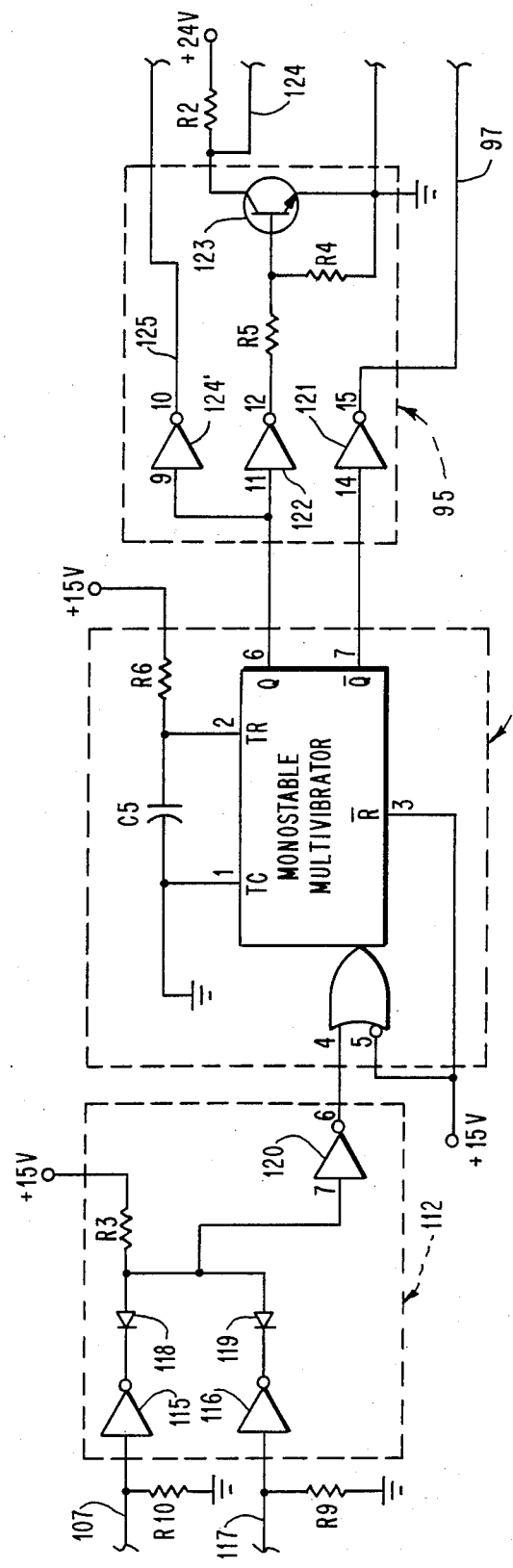
FIG. 9
FIG. 10

METHOD AND APPARATUS FOR ALIGNING CUTTING TOOLS

This invention relates to a method and apparatus for forming aligned bore holes or the like in opposite side walls of a part and, more particularly, to a method and apparatus using separate cutting tools on opposite sides of a part to form bore holes or the like in the two opposite side walls in alignment with each other.

A numerically controlled duplex machine tool arrangement has machine tools disposed on opposite sides of a common part mounted in a fixture. When the part is relatively thick, a substantial period of time is required to form a bore hole by use of only the cutting tool on one of the machine tools. The formation of one-half of the bore hole with one of the cutting tools and the other half of the bore hole with the cutting tool on the opposite side of the part would be much faster since these could be accomplished at the same time.

However, because of machine tool inaccuracies arising from elements such as the ball screws, resolvers, and thermal effects between the two machine tools, it has not previously been possible to maintain accurate alignment between the two machine tools. As a result, a bore hole has been formed in the part by the cutting tool mounted in only one of the spindles.

The present invention satisfactorily solves the alignment problem when using two separately independently movable spindle carriers through positioning the spindle carrier of one of the two machine tools, which is designated as a master, at a desired position so that the longitudinal axis of the cutting tool is aligned with the center of the bore hole to be formed. Then, the spindle carrier of the other machine tool, which is designated a slave, has the longitudinal axis of its cutting tool aligned with respect to the longitudinal axis of the cutting tool supported by the spindle carrier of the master machine tool. As a result, the longitudinal axes of the cutting tools and the spindles of the master and slave machine tools will be aligned.

This alignment of the two spindle axes preferably is accomplished through utilizing a laser, preferably mounted on the spindle carrier of the master machine tool in the Y-plane of the spindle axis, and a target mounted on the spindle carrier of the slave machine tool in the Y-plane of the spindle axis. This enables precise positioning of the slave machine tool with respect to the master machine tool when it is desired to form a bore hole with each of the machine tools having its cutting tool form one-half of the bore hole.

An object of this invention is to provide a method and apparatus for accurately forming bore holes or the like in alignment with each other in opposite side walls of a part.

Another object of this invention is to provide a method and apparatus for precise positioning of a cutting tool in each of two spindles disposed on opposite sides of a part.

Other objects of this invention will be readily perceived from the following description, claims, and drawings.

The attached drawings illustrate a preferred embodiment of the invention, in which:

FIG. 1 is a perspective view showing two machine tools that would be arranged on opposite sides of a part;

FIG. 2 is a pictorial view showing the alignment cycle of the slave machine tool with respect to the master machine tool by a laser beam;

FIG. 3 is a block diagram showing an arrangement for sensing when there is alignment of the spindles of the two machine tools in each of two different orthogonal planes;

FIG. 9 is an electrical circuit diagram of a power supply and filter of the power supply board of FIG. 8;

FIG. 10 is an electrical circuit diagram of drivers of the power supply board of FIG. 8 for producing signals to an audio device, to a computer numerical control that the spindle axes are aligned, and to set a portion of a zero detector;

FIG. 11 is an electrical circuit diagram of drivers of the power supply board of FIG. 8 for activating lights to show the axis of movement along which there is to be sensing when the spindles of the two machine tools are being aligned in a plane containing that specific axis;

Figure 4:
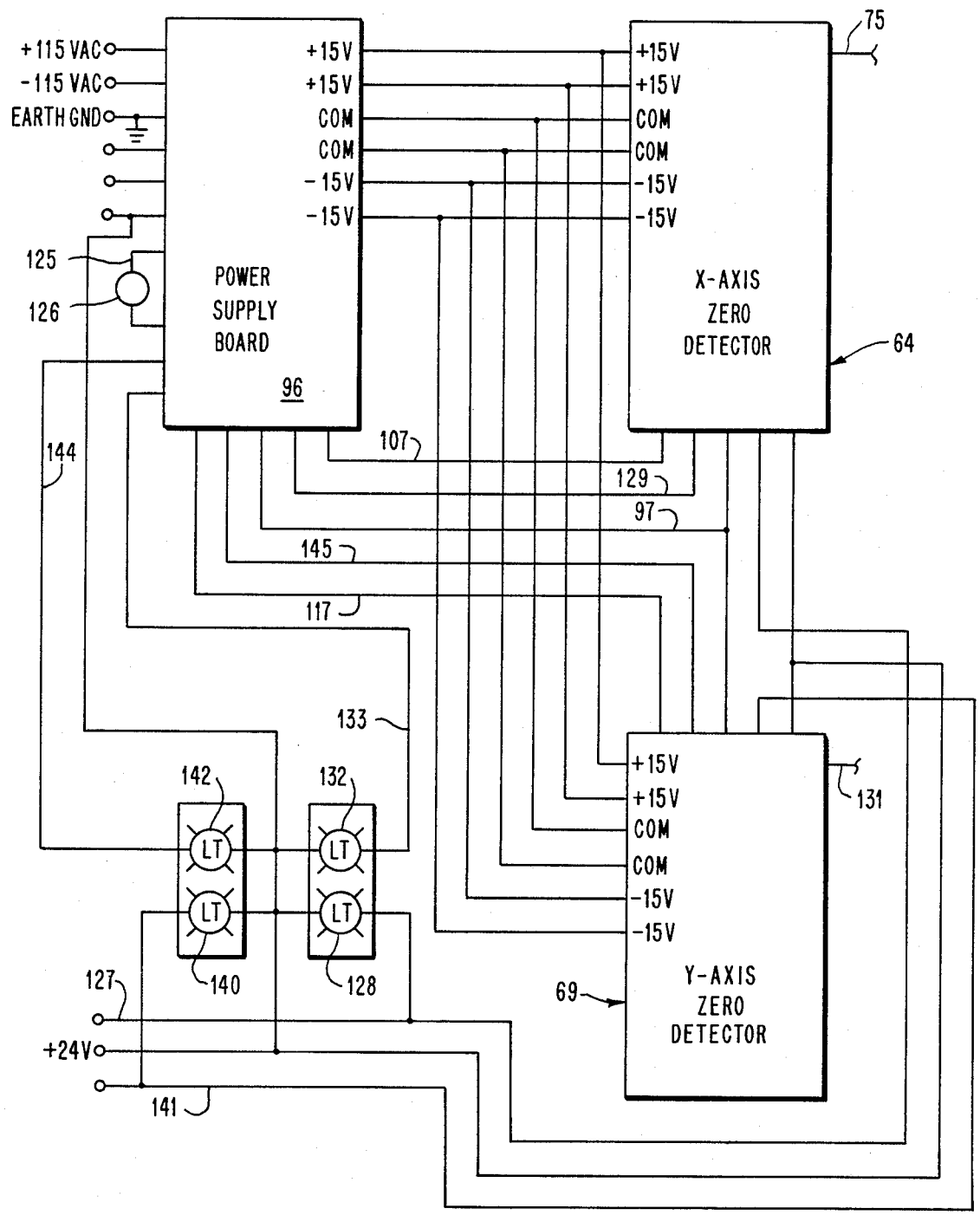
FIG. 4 is an interconnection block diagram for detecting when the axes of the spindles of the two machine tools and the longitudinal axes of the cutting tools supported by the spindles are aligned in two different orthogonal planes at different times.

Referring to the drawings and particularly FIG. 1, there is shown a machine tool 10 disposed on one side of a part-fixture area 11 and a machine tool 12 disposed on the opposite side of the part-fixture area 11. The machine tool 10 includes a base 13, which is supported on a floor 14, having a saddle 15 slidably mounted thereon for movement along horizontal ways 16 along an X-axis 17.

A cross slide 18 is slidably mounted on horizontal ways 19 on the saddle 15 for movement along a Z-axis 20. A spindle carrier 21 is slidably mounted on vertical ways 22 of a vertical portion 23 of the cross slide 18 for movement along a Y-axis 24.

The spindle carrier 21 has a spindle 25 rotatably mounted therein for rotation about an axis 26, which is parallel to the Z-axis 20. The spindle 25 has a cutting tool 27 such as a boring bar, for example, mounted therein for boring a bore hole 28 (see FIG. 12), for example, in a part 29, which is held within the part-fixture area 11 (see FIG. 1) by a suitable fixture (not shown). The longitudinal axis of the cutting tool 27 is on the axis 26 of the spindle 25.

The machine tool 12 includes a base 31 mounted on the floor 14. The base 31 has a saddle 32 slidably mounted thereon for movement along horizontal ways 33 along an X-axis 34.

A cross slide 35 is slidably mounted on horizontal ways 36 on the saddle 32 for movement along a Z-axis 37. A spindle carrier 38 is slidably mounted on vertical ways 39 of a vertical portion 40 of the cross slide 35 for movement along a Y-axis 41.

It should be understood that the movement of each of the saddle 15 along the X-axis 17, the cross slide 18 along the Z-axis 20, the spindle carrier 21 along the Y-axis 24, the saddle 32 along the X-axis 34, the cross slide 35 along the Z-axis 37, and the spindle carrier 38 along the Y-axis 41 is controlled by a separate motive or drive means. Each of these separate motive or drive means preferably includes a motor and a ball screw connected in the well-known manner for driving. Any other suitable motive or drive means may be employed.

The spindle carrier 38 has a spindle 42 rotatably mounted therein for rotation about an axis 43, which is parallel to the Z-axis 37. The spindle 42 has a cutting tool 44 such as a boring bar, for example, mounted therein for boring a bore hole 45 (see FIG. 12), for example, in the part 29 in alignment with the bore hole 28. The longitudinal axis of the cutting tool 44 (see FIG. 1) is on the axis 43 of the spindle 42.

The spindle carrier 21 has light producing means such as a laser 46, for example, mounted on its top 47 and preferably disposed in the same Y-plane as the axis 26 of the spindle 25. While it is not a requisite that the laser 46 be disposed in the same Y-plane as the axis 26 of the spindle 25, less software instructions are required with such an arrangement.

The laser 46 (see FIG. 1) produces a laser beam 48 along a path, which is parallel to the axis 26 of the spindle 25 and the axis 43 of the spindle 42. The laser beam 48 is directed to a laser target 49, which is mounted on top 50 of the spindle carrier 38. The target 49 is disposed in the same Y-plane as the axis 43 of the spindle 42 when the laser 46 is disposed in the same Y-plane as the axis 26 of the spindle 25.

A target amplifier 51 is mounted on the top 50 of the spindle carrier 38. The output of the laser target 49 is connected to the amplifier 51 by a conductor 52. The target amplifier 51 has its output connected by two conductors 53 (see FIG. 3) and 54 to a dual axis digital readout 55. The digital readout 55 has indicia 56 providing a horizontal digital readout for movement along a first axis and indicia 57 providing a vertical digital readout for movement along a second axis orthogonal to the first axis.

One suitable example of the laser 46 is a laser sold by Hamar Laser Instruments Inc., Wilton, Conn. as model 800 spindle laser. One suitable example of the laser target 49 when using the model 800 spindle laser of Hamar Laser Instruments Inc. is a laser target sold as model T-218 universal target by Hamar Laser Instruments Inc. The model T-218 universal target also includes the target amplifier 51 in addition to the target 49. One suitable example of the dual axis digital readout 55 is a digital readout sold by Hamar Laser Instruments Inc. as model R306A readout, dual axis. Any other suitable laser, target, target amplifier, and axis readout may be employed.

When the machine tools 10 (see FIG. 1) and 12 are mounted on the floor 14, it is necessary to align the axis 26 of the spindle 25 of the machine tool 10 and the axis 43 of the spindle 42 of the machine tool 12 with each other in both X and Y planes. This is because it is necessary to position the machine tool 12 so that the axis 43 of the spindle 42 is at the intersection of the X-plane and Y-plane of the axis 26 of the spindle 25 of the machine tool 10. This defines the precise centerline of the spindle 25 about which the cutting tool 27 rotates and also defines the longitudinal axis of the cutting tool 27.

The laser 46 is permanently mounted on the spindle carrier 21 and preferably with its center in the Y-plane passing through the axis 26 of the spindle 25 although it could be offset therefrom if desired. However, as previously mentioned, this would require further software instructions.

The laser target 49 is mounted on the top 50 of the spindle carrier 38 of the machine tool 12 in approximately the same area as the laser 46 is mounted on the top 47 of the spindle carrier 21 of the machine tool 10. Therefore, when the laser 46 is in the Y-plane of the axis 26 of the spindle 25 of the spindle carrier 21, the target 49 is mounted with its center in the Y-plane of the axis 43 of the spindle 42 of the spindle carrier 38.

After mounting the laser 46 on the top 47 of the spindle carrier 21 and the target 49 on the top 50 of the spindle carrier 38, the axis 26 of the spindle 25 of the machine tool 10 and the axis 43 of the spindle 42 of the machine tool 12 must be mechanically aligned in the X and Y planes by any suitable aligning method. For example, a tool holder could be mounted on one of the spindles 25 and 42 such as the spindle 25, for example, with an indicator on the tool holder. The spindles 25 and 42 would then be moved toward each other so that the indicator on the tool holder on the spindle 25 touches the circumference of the spindle 42. Then, the spindle 25 is rotated so that the indicator moves around the spindle 42 between the two points in the X-plane. If the reading is not zero, one of the spindles 25 and 42 is moved in the X direction one half of the error read by the indicator so that it should then be zero. Then, the operation is repeated in the Y-plane. When the indicator reads zero during its travel around the spindle 42 in both the X and Y planes, the spindles 25 and 42 are mechanically aligned.

Then, the laser 46 and the target 49 are moved around on the top 47 of the spindle carrier 21 and the top 50 of the spindle carrier 38, respectively, to line them up by having a zero readout in each of the indicia 56 (see FIG. 3) and the indicia 57 of the dual axis readout 55. When this occurs, the path of the laser beam 48 is in a Z-plane which is parallel to both the axis 26 (see FIG. 1) of the spindle 25 of the spindle carrier 21 and the axis 43 of the spindle 42 of the spindle carrier 38.

The laser 46 is moved on the top 47 of the spindle carrier 21, for example, by shims or grinding the mounting brackets or other support structure of the laser 46 on the top 47 of the spindle carrier 21 to move the path of the laser beam 48 to the desired position. If each of the indicia 56 (see FIG. 3) and the indicia 57 of the dual axis readout 55 do not read zero after adjustment of the laser 46, the position of the target 49 on the top 50 of the spindle carrier 38 must then be adjusted in the same manner as the laser 46 is adjusted.

Then, the spindle carrier 21 (see FIG. 1) is moved in a Z direction by the cross slide 18 moving along the Z-axis 20. This insures that the path of the laser beam 48 is parallel to the axis 26 of the spindle 25 of the spindle carrier 21 and the axis 43 of the spindle 42 of the spindle carrier 38. If the indicia 56 (see FIG. 3) and the indicia 57 of the readout 55 do not remain zero during such shifting, then the laser 46 again has its position shifted slightly. This mechanical alignment will insure that the laser beam 48 from the laser 46 is along the desired path. The readout 55 is employed only during this initial set-up alignment.

Figure 12:
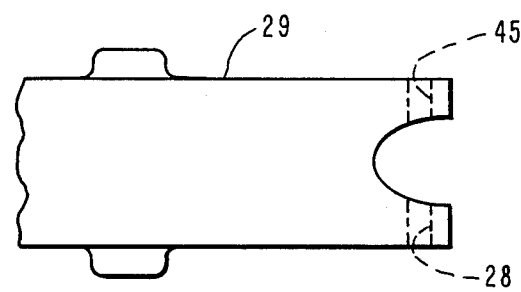
FIG. 12 is a fragmentary top plan view of a portion of a part in which bore holes are to be formed.

Each of the machine tools 10 (see FIG. 1) and 12 operates independently of the other in most of the machining operations on the part 29 (see FIG. 12). The machining activity is not necessarily the same on each side of the part 29 so that the machine tools 10 (see FIG. 1) and 12 may be disposed at different positions relative to the part 29 (see FIG. 12) when it is time for the bore holes 28 and 45 to be formed.

The machine tool 10 (see FIG. 1) has its own computer numerical control (CNC) 58 (see FIG. 13) for controlling its operation in accordance with its numerical control part program. The machine tool 12 (see FIG. 1) has its own CNC 59 (see FIG. 13) for controlling its operation in accordance with its numerical control part program. The CNC 58 and the CNC 59 communicate with each other through a serial network link 60 whenever coordination and/or interlocking of the cycles of the machine tool 10 (see FIG. 1) and the machine tool 12 are required. One suitable example of the serial network link 60 (see FIG. 13) is a serial network link sold under the trademark DATA HIGHWAY by Allen-Bradley.

The CNC 58 is a 900 MC control sold by Cincinnati Milacron Inc., the assignee of this application. The CNC 58 includes the base software of the 900 MC control and mechanism step controller (MSC) software. The CNC 58 is connected to the serial network link 60 through a program logic controller 61 (PLC).

The CNC 58 also has the numerical control part program which determines how the part 29 (see FIG. 12) is machined by the machine tool 10 (see FIG. 1) and in what sequence. The base software of the 900 MC control of the CNC 58 (see FIG. 13) controls the reading of this numerical control part program sequence and a surface sensing canned cycle routine. The numerical control part program also controls when the alignment cycle will occur prior to forming the bore holes 28 (see FIG. 12) and 45 in the part 29. It should be understood that other alignment cycles for other bore holes (not shown) in the part 29 also may occur.

The CNC 59 (see FIG. 13) is a 900 MC control sold by Cincinnati Milacron Inc. The CNC 59 includes the base software of the 900 MC control and MSC software. The CNC 59 also has the numerical control part program which determines how the part 29 (see FIG. 12) is machined by the machine tool 12 (see FIG. 1) and in what sequence.

The CNC 59 (see FIG. 13) is connected to the serial network link 60 through a PLC 62. One suitable example of each of the PLCs 61 and 62 is sold by Allen-Bradley as model 2/30.

Figure 13:
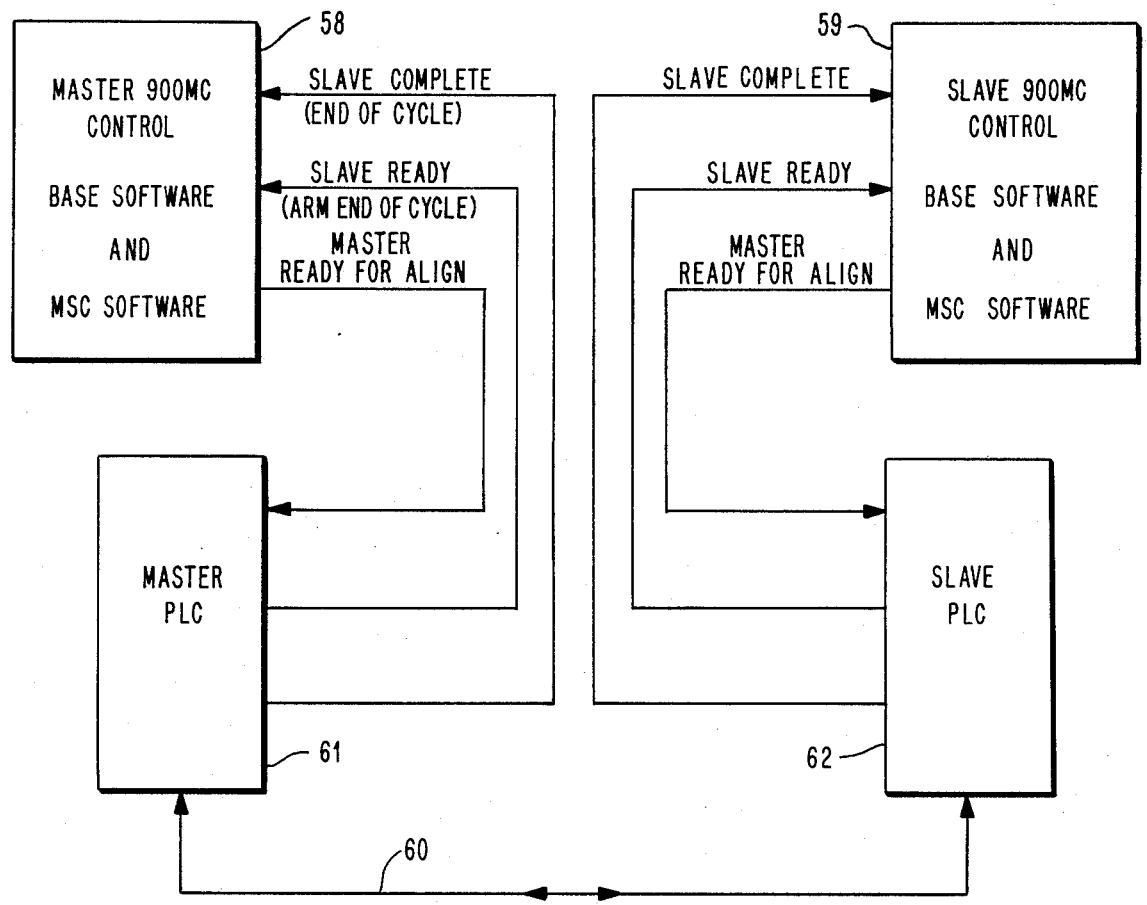
FIG. 13 is a schematic block diagram of a portion of a control system for controlling the alignment of the spindles.

In the schematic of FIG. 13, the machine tool 10 (see FIG. 1) is the master, and the machine tool 12 is the slave.

When the CNC 58 (see FIG. 13) has its base software encounter a laser alignment command signal initially, the machine tool 10 (see FIG. 1) must wait for the CNC 59 (see FIG. 13) to also encounter the laser alignment command. When the CNC 59 has its base software encounter a laser alignment command initially, the machine tool 12 (see FIG. 1) must wait for the CNC 58 (see FIG. 13) to also encounter the laser alignment command.

The alignment cycle begins when the machine tool 10 (see FIG. 1) has been positioned at the location at which the bore hole 28 (see FIG. 12), for example, is to be formed in the part 29 by the cutting tool 27 (see FIG. 1) of the machine tool 10. This is with the longitudinal axis of the cutting tool 27 aligned with the center of the bore hole 28 (see FIG. 12) to be formed in the part 29. The numerical control part program of the CNC 58 (see FIG. 13) contains the codes that start the alignment activity.

With the machine tool 10 (see FIG. 1) having the cutting tool 27 at the desired position to form the bore hole 28 (see FIG. 12) in the part 29, then there is movement of the spindle carrier 38 (see FIG. 1) of the machine tool 12 as shown schematically in FIG. 2. When there is to be alignment of the axis 43 of the spindle 42 (see FIG. 1) of the spindle carrier 38 with the axis 26 of the spindle 25 of the spindle carrier 21 by movements in the X direction relative to a zero line 63 (see FIG. 2), the spindle carrier 38 (see FIG. 1) is initially moved a first selected distance (not shown) in the +X direction (see FIG. 2) after the spindle carrier 38 (see FIG. 1) had been disposed in the X direction as close as possible to the zero line 63 (see FIG. 2) by the base software of the CNC 59 (see FIG. 13).

The spindle carrier 38 (see FIG. 1) is moved in the +X direction (see FIG. 2) so that there is activation or energization of a zero detector 64 (see FIG. 4) when the axis 43 (see FIG. 1) of the spindle 42 is at a second selected distance from the zero line 63 (see FIG. 2). After activation or energization of the zero detector 64 (see FIG. 4), the spindle carrier 38 (see FIG. 1) is continued to be moved in the +X direction of FIG. 2 until the axis 43 (see FIG. 1) of the spindle 42 travels the first selected distance from its start.

The first selected distance may be approximately 0.150" and the second selected distance may be about 0.025", for example. At this first selected distance of movement in the +X direction, the spindle carrier 38 (see FIG. 1) is stopped by the base software of the CNC 59 (see FIG. 13).

Then, the spindle carrier 38 (see FIG. 1) is moved in the −X direction of FIG. 2 as indicated by a line 65 through movement of the saddle 32 (see FIG. 1) along the X axis 34 at a relatively fast feed rate of about ten inches per minute. When the zero detector 64 (see FIG. 4) detects that the axis 43 (see FIG. 1) of the spindle 42 of the spindle carrier 38 is approaching the zero line 63 (see FIG. 2) and is at a predetermined distance therefrom, energization of the motive or drive means for moving the saddle 32 (see FIG. 1) is stopped. The momentum of the saddle 32 carries the axis 43 of the spindle 42 of the spindle carrier 38 past the zero line 63 (see FIG. 2).

After movement of the spindle carrier 38 (see FIG. 1) in the −X direction (see FIG. 2) stops after passing the zero line 63, the base software of the CNC 59 (see FIG. 13) causes retraction in the +X direction (see FIG. 2) of the spindle carrier 38 (see FIG. 1) by activation of the saddle 32 for a third selected distance as indicated in FIG. 2 by a line 66. This third selected distance is greater than the second selected distance at which the zero detector 64 (see FIG. 4) is energized for detecting motion in the X direction but less than the first selected distance that the spindle carrier 38 (see FIG. 1) was moved at the fast feed rate of ten inches per minute. For example, the third selected distance as indicated by the line 66 (see FIG. 2) can be 0.060".

After the axis 43 (see FIG. 1) of the spindle 42 of the spindle carrier 38 has been advanced the third selected distance in the +X direction in FIG. 2, the spindle carrier 38 (see FIG. 1) is moved in the −X direction (see FIG. 2) as indicated by a line 67. This movement along the X axis 34 (see FIG. 1), indicated by the line 67 in FIG. 2, is at a very slow feed rate of one-half inch per minute. Thus, this slow feed rate is only one twentieth of the fast feed rate.

Accordingly, when the zero detector 64 (see FIG. 4) detects that the axis 43 (see FIG. 1) of the spindle 42 of the spindle carrier 38 is at the predetermined distance from the zero line 63 (see FIG. 2), a signal will be supplied to the base software of the CNC 59 (see FIG. 13) to stop feeding of the saddle 32 (see FIG. 1) along the X-axis 34 so that the spindle carrier 38 can decelerate to a position at which the axis 43 of the spindle 42 of the spindle carrier 38 is aligned with the axis 26 of the spindle 25 of the spindle carrier 21 when the spindle carrier 38 is moving along the X-axis 34. This is indicated by the zero line 63 in FIG. 2. The predetermined distance at which the saddle 32 (see FIG. 1) has its motive or drive means inactivated is when the axis 43 of the spindle 42 of the spindle carrier 38 is 0.0009" away from the zero line 63 (see FIG. 2), which also may be called the zero point along the X-axis 34 (see FIG. 1).

The same feeding of the spindle carrier 38 occurs in the Y directions by movement of the spindle carrier 38 along the Y-axis 41 after alignment has been completed in the X directions. These movements in the Y directions are shown in FIG. 2 relative to a zero line 68, which also may be called the zero point along the Y-axis 41 (see FIG. 1). The operation is the same as for movement in the X direction except that a zero detector 69 (see FIG. 4), which has the same circuitry as the zero detector 64 in FIG. 5, is used rather than the zero detector 64 so that the operation will not be described.

As previously mentioned, the alignment cycle begins when the machine tool 10 (see FIG. 1) is disposed at the location at which the bore hole 28 (see FIG. 12), for example, is to be formed in the part 29 by the cutting tool 27 (see FIG. 1) of the machine tool 10. At that time, the base software of the CNC 58 (see FIG. 13) encounters a M90 code within its numerical control part program and transfers control to the MSC software of the CNC 58 to execute the M-function. It should be understood that an M code is a miscellaneous code and does not cause an axis move, a canned cycle, a fixture offset, or a feed rate. The M-function is a miscellaneous function corresponding to the specific M code.

The MSC of the CNC 58 produces a signal to turn on the laser 46 (see FIG. 1) and to supply an output signal to the PLC 61 (see FIG. 13) that the machine tool 10 (see FIG. 1) is ready for alignment of the machine tool 12. The PLC 61 (see FIG. 13) detects the output of the MSC of the CNC 58 as an input and signals to the PLC 62 along the serial network link 60 that the machine tool 10 (see FIG. 1) is ready through the longitudinal axis of the cutting tool 27 being disposed in alignment with the center of the bore hole 28 (see FIG. 12) to be formed in the part 29 by the cutting tool 27 (see FIG. 1). Upon receipt of the input signal from the PLC 61 (see FIG. 13), the PLC 62 signals the MSC of the CNC 59 through an output that it is to begin its alignment activity so that the axis 43 (see FIG. 1) of the spindle 42 of the spindle carrier 38 of the machine tool 12 is aligned with the axis 26 of the spindle 25 of the spindle carrier 21 of the machine tool 10.

The base software of the CNC 59 (see FIG. 13) will only react to the signal from the base software of the CNC 58 if the machine tool 12 (see FIG. 1) is at the proper location in its numerical control part program in the CNC 59 (see FIG. 13). If the machine tool 12 (see FIG. 1) is not at this position, the machine tool 10 remains stationary until the machine tool 12 catches up in its cycle.

The base software of the CNC 59 (see FIG. 13) encounters a M90 code in its numerical control part program and transfers control to the MSC software of the CNC 59 to execute the M-function. The MSC of the CNC 59 energizes the laser target 49 (see FIG. 1) and signals to the MSC of the CNC 58 (see FIG. 13) through the PLC 62, the serial network link 60, and the PLC 61 to the CNC 58 that the MSC of the CNC 58 is to arm its completion release input and look for the end of the alignment cycle. The MSC of the CNC 58 enables its release input to detect the end of the alignment cycle.

With the numerical control part program in the CNC 58 in synchronization with the numerical control part program in the CNC 59, the remainder of the motion occurs at the machine tool 12 (see FIG. 1) until the base software of the CNC 59 (see FIG. 13) signals to the base software of the CNC 58 that the alignment cycle of the machine tool 12 (see FIG. 1) has been completed. The MSC of the CNC 59 (see FIG. 13) energizes the target 49 (see FIG. 1) for alignment with the laser 46 in an X plane in which the spindle carrier 38 will be moved along the X-axis 34 in opposite (+ and −) directions as shown in FIG. 2 and previously described.

The MSC of the CNC 59 (see FIG. 13) releases control of the numerical control part program and returns control to the base software of the CNC 59 to allow the base software to read the next data block of the numerical control part program. The next data block in the numerical control part program contains a G77 canned cycle for surface sensing in which the base software of the CNC 59 performs a surface sensing activity using the target 49 (see FIG. 1) as its sensing device. This enables the axis 43 of the spindle 42 of the spindle carrier 38 to be aligned in the X-plane with the axis 26 of the spindle 25 of the spindle carrier 21 of the machine tool 10.

As previously mentioned and described with respect to FIG. 2, there is an initial motion along the X-axis 34 (see FIG. 1) in the + direction (see FIG. 2) for the first selected distance of approximately 0.150". This initial motion begins adjacent but not at the zero line 63, which also defines the zero point or selected position in the X-plane. This is the location at which the axis 43 (see FIG. 1) of the spindle 42 of the spindle carrier 38 of the machine tool 12 is aligned in the X-plane with the axis 26 of the spindle 25 of the spindle carrier 21 of the machine tool 10. This motion is created by the G77 canned cycle for surface sensing in the numerical control part program of the CNC 59 (see FIG. 13).

A high ARM signal is supplied from the base software of the CNC 59 through a conductor 70 (see FIG. 7) to an optically coupled isolator 71 of an arming circuit 72 of an arm and reset circuit 73 when an alignment cycle is to occur. The return path to the base software of the CNC 59 is through a conductor 73'. One suitable example of the optically coupled isolator 71 is an optical isolator sold by General Instruments, Palo Alto, Calif. model MCA255.

The output of the optically coupled isolator 71 is supplied from the arming circuit 72 by a conductor 74. The isolator 71 inverts the high input signal from the conductor 70 so that a low signal is on the conductor 74 when the arm and reset circuit 73 is to be armed by the base software of the CNC 59 (see FIG. 13).

Figure 5:
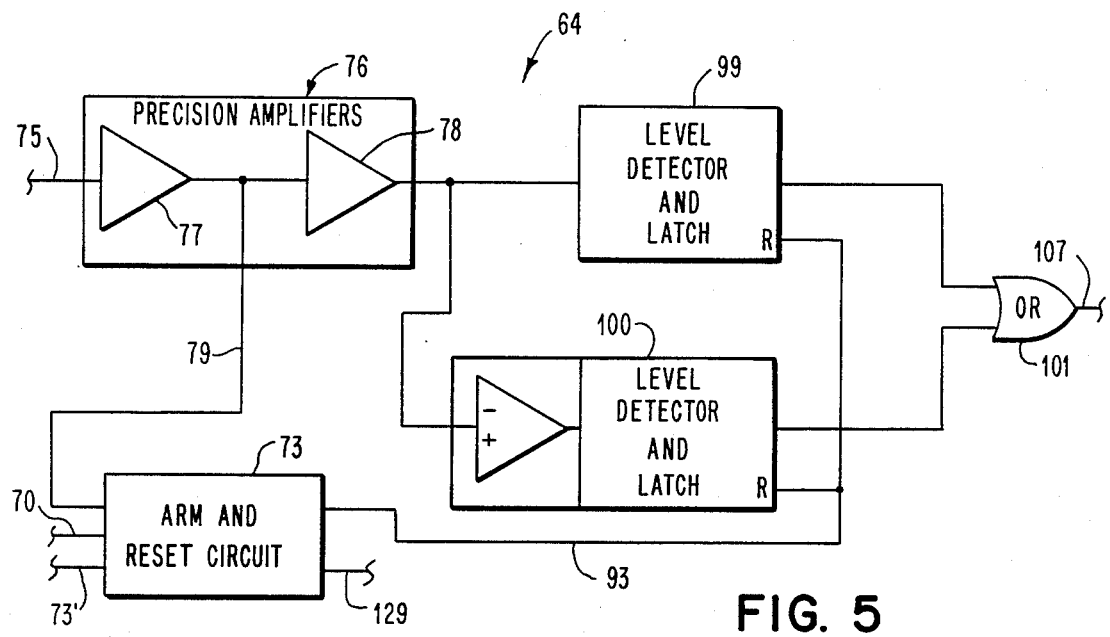
FIG. 5 is a block diagram of one of the zero detectors of FIG. 4 for detecting when there is alignment of the spindles of the two machine tools along one plane.
Figure 6:
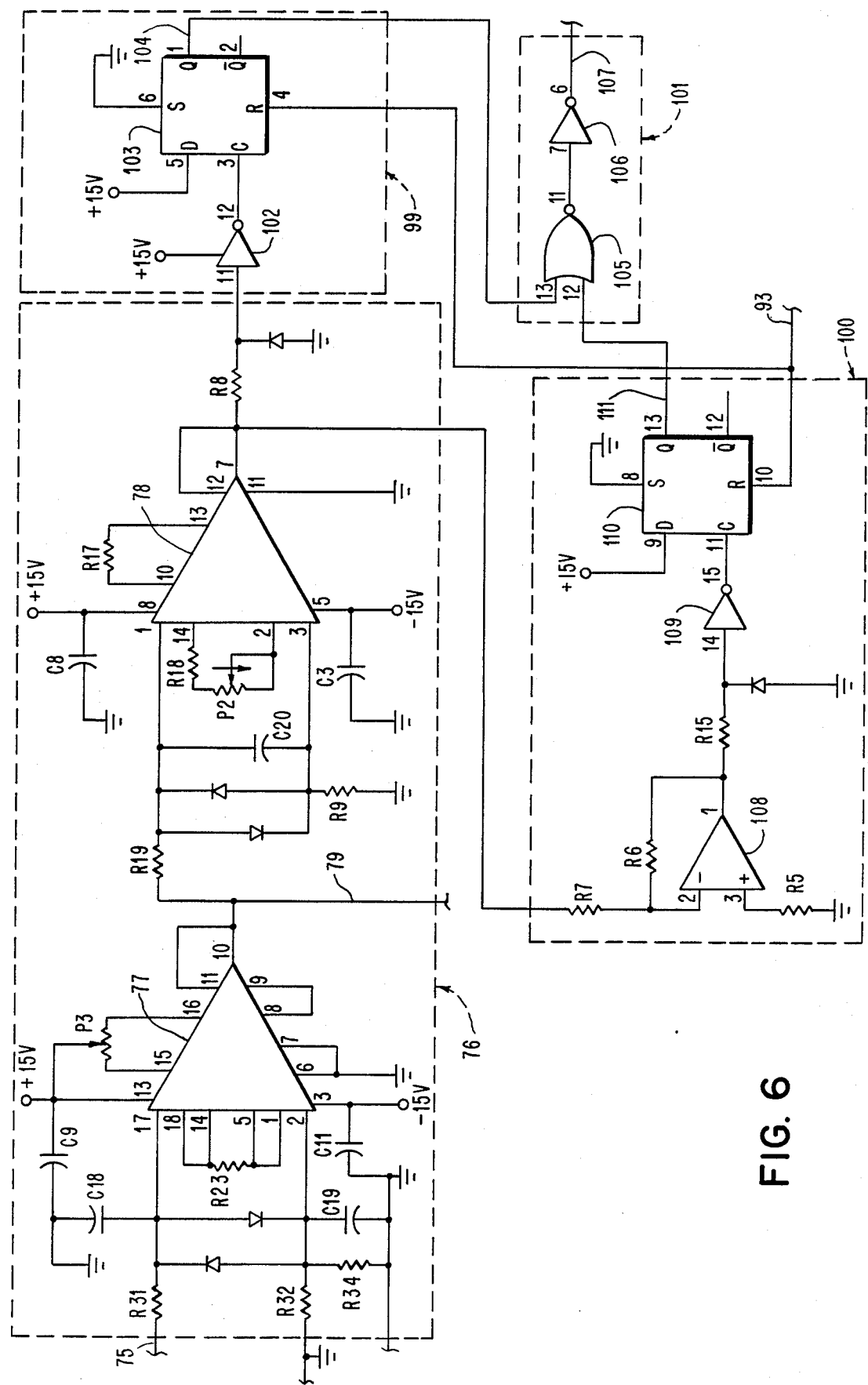
FIG. 6 is an electrical circuit diagram of portions of the zero detector of FIG. 5 including the zero detecting portion.

As the target 49 (see FIG. 1) is moved along the X-axis 34 in the + direction of FIG. 2, the voltage produced by the target 49 increases positively. The output of the target amplifier 51 (see FIG. 3), which amplifies the output of the target 49, is supplied from the readout 55 through a conductor 75 to the X-axis zero detector 64, which includes precision amplifiers 76 (see FIG. 5). As shown in FIG. 6, the precision amplifiers 76 include an instrumentation amplifier 77 and an instrumentation amplifier 78.

One suitable example of the amplifier 77 is a precision instrumentation amplifier sold as model 3630BM by Burr-Brown Corporation, Columbus, Ohio. One suitable example of the amplifier 78 is an instrumentation amplifier sold by Analog Devices, Norwood, Mass. as model AD521.

In addition to the output of the instrumentation amplifier 77 being connected to the negative input of the instrumentation amplifier 78, it also is connected through a conductor 79 to the arming circuit 72 (see FIG. 7) of the arm and reset circuit 73. When the voltage level on the conductor 79 reaches a predetermined level during movement of the spindle carrier 38 (see FIG. 1) in the +X direction, as shown in FIG. 2, away from the zero line 63 with the spindle carrier 38 (see FIG. 1) being at the second selected distance from the zero line 63 (see FIG. 2), a low RESET signal is produced from a reset circuit 80 (see FIG. 7) of the arm and reset circuit 73.

The voltage level on the conductor 79 is supplied to the positive input of an operational amplifier 81 and a negative input of an operational amplifier 82, which has its positive input connected to the output of the operational amplifier 81. Since the operational amplifiers 81 and 82 function as a precision rectifier, the output of the operational amplifier 82 is always positive.

The output of the operational amplifier 82 is supplied to the positive input of an operational amplifier 83, which has a predetermined constant voltage level applied to its negative input. When the predetermined voltage level at the negative input of the operational amplifier 83 is exceeded by the output of the operational amplifier 82 by the spindle carrier 38 (see FIG. 1) being at the second selected distance from the zero line 63 (see FIG. 2) in the +X direction, the operational amplifier 83 (see FIG. 7) detects this voltage level change to produce a high output over a conductor 84 to an inverter 85 of the reset circuit 80.

The output of the inverter 85 is one input to a NOR gate 86, which has the output of the arming circuit 72 supplied over the conductor 74 and a conductor 87 as its other input. The arming circuit 72 supplies a low output over the conductors 74 and 87 from the optically coupled isolator 71 when the ARM signal on the conductor 70 from the base software of the CNC 59 (see FIG. 13) is high.

When both of the inputs to the NOR gate 86 (see FIG. 7) are low, the NOR gate 86 has a high output, which is one of two inputs to a NOR gate 88. The other input to the NOR gate 88 is the output of a NOR gate 89, which has the output of the NOR gate 88 as one of its two inputs. The NOR gates 88 and 89 are wired to provide a flip flop circuit.

Thus, when the output of the NOR gate 86 goes up, the output of the NOR gate 88 goes low. With the NOR gate 89 having its other input low, its output is high to cause the output of a NOR gate 90 to go low. As a result of the NOR gate 90 going low, the output of a NOR gate 91 goes high since its other input from the optically coupled isolator 71 is low whereby a NOR gate 92 produces a low RESET signal on a conductor 93.

Figure 8:
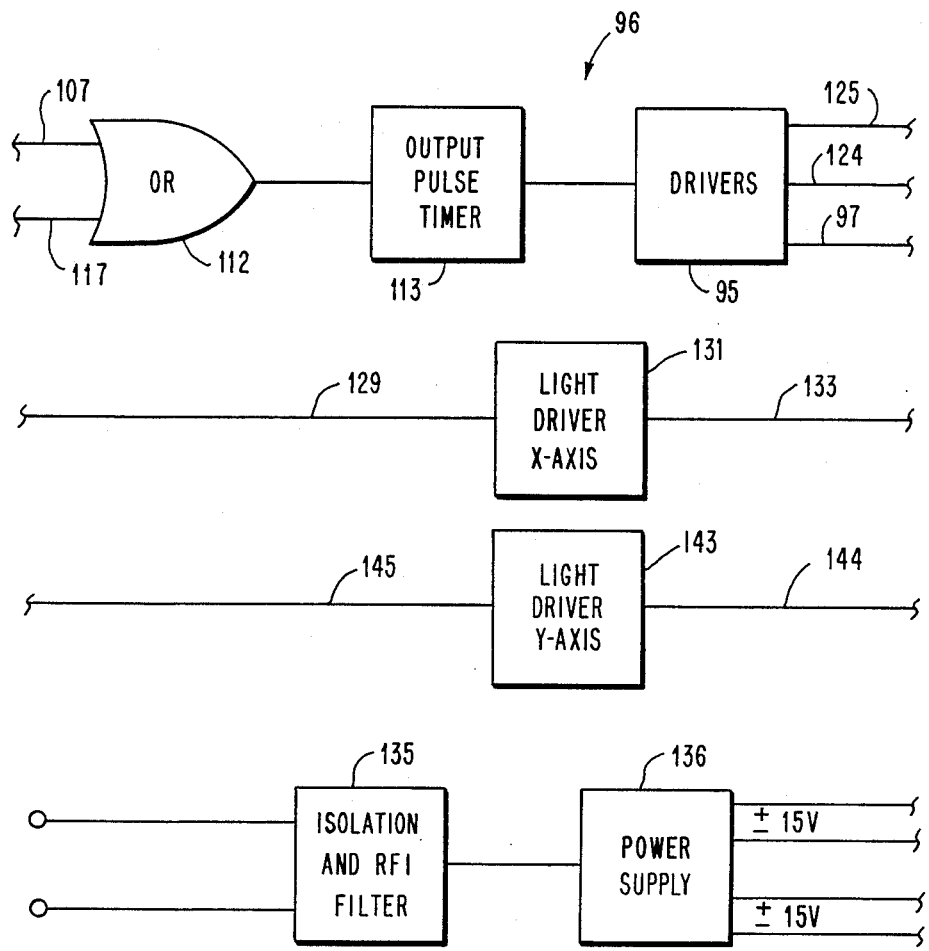
FIG. 8 is a schematic block diagram of a power supply board of FIG. 4.

The state of the other input to the NOR gate 89 is controlled from a NOR gate 94 having a low signal as one input and a SET signal from one of a plurality of drivers 95 (see FIG. 8) of a power supply board 96 as its other input supplied over a conductor 97. Since the SET signal is low when the output of the operational amplifier 83 (see FIG. 7) goes high, the output of the NOR gate 94 is high. This high signal becomes a low after passing through an inverter 98.

One suitable example of the operational amplifiers 81, 82, and 83 is an operational amplifier sold by Texas Instruments, Inc. as model TL082. One suitable example of the inverters 85 and 98 is a CMOS inverter buffer sold by Motorola as model MC14049B. One suitable example of the NOR gates 86, 88–92, and 94 is a CMOS NOR gate sold by Motorola as model MC14001B.

This low RESET signal, which is supplied from the arm and reset circuit 73 over the conductor 93 to a level detector and latch circuit 99 (see FIG. 5) and a level detector and latch circuit 100 of the zero detector 64, activates the zero detector 64 so that an output is supplied therefrom only when a negative going signal from the instrumentation amplifier 78 of the precision amplifiers 76 reaches zero. This occurs only when the spindle carrier 38 (see FIG. 1) is moving in the —X direction of FIG. 2 towards the zero line 63 and just prior to reaching the zero line 63. As previously mentioned, this predetermined distance is 0.0009" so that when the spindle carrier 38 (see FIG. 1) is moving at the slow feed rate of one-half inch per minute, the axis 43 of the spindle 42 of the spindle carrier 38 of the machine tool 12 will be aligned with the axis 26 of the spindle 25 of the spindle carrier 21 of the machine tool 10 in the X-plane when the spindle carrier 38 decelerates to a stop after an output from the zero detector 64 (see FIG. 5).

When the negative going signal from the instrumentation amplifier 78 reaches zero, the level detector and latch 99 is activated to produce an output therefrom as one input to an OR circuit 101. The level detector and latch 100 produces an output when a positive going signal reaches zero. With the directions of motion of the spindle carrier 38 (see FIG. 1) being those described herein, the level detector and latch 100 is not employed. However, if the directions of motion are opposite to those described so that the two feed rates towards the zero line 63 (see FIG. 2) in the X-plane of the spindle carrier 38 (see FIG. 1) were in the + direction, as shown in FIG. 2, rather than in the — direction, then the level detector and latch 100 (see FIG. 5) would be employed rather than the level detector and latch 99.

As shown in FIG. 6, the level detector and latch 99 includes an inverter 102 having its input connected to the output of the instrumentation amplifier 78 of the precision amplifiers 76 and its output connected to C input of a D-type flip flop 103. The flip flop 103 has its Q output connected by a conductor 104 to one input of a NOR gate 105 of the OR circuit 101. The OR circuit 101 also includes an inverter 106 having its input connected to the output of the NOR gate 105 and its output connected to a conductor 107.

The level detector and latch 100 includes an operational amplifier 108 having its negative input connected to the output of the instrumentation amplifier 78 of the precision amplifiers 76 and its positive input grounded. The level detector and latch 100 includes an inverter 109 having its input connected to the output of the operational amplifier 108 and its output connected to C input of a D-type flip flop 110. The D-type flip flop 110 has its Q output connected by a conductor 111 as an input to the NOR gate 105 of the OR circuit 101.

One suitable example of each of the inverters 102, 106, and 109 is a CMOS inverter buffer sold by Motorola as model MC14049B. One suitable example of each of the D-type flip flops 103 and 110 is a CMOS D-type flip flop sold by Motorola as model MC14013B. One suitable example of the NOR gate 105 is a CMOS NOR gate sold by Motorola as model MC14001B. One suitable example of the operational amplifier 108 is an operational amplifier sold by Texas Instruments, Inc. as model TL082.

The base software of the CNC 59 (see FIG. 13) stops the motion of the spindle carrier 38 (see FIG. 1) in the +X direction of FIG. 2 after movement the first selected distance from its start. This is approximately 0.150" from the zero line 63 as previously mentioned but varies therefrom because the start of the alignment cycle does not begin with the axis 43 (see FIG. 1) of the spindle 42 of the spindle carrier 38 of the machine tool 12 being precisely at the zero line 63 (see FIG. 2).

Then, the base software of the CNC 59 (see FIG. 13) causes the CNC 59 to feed the spindle carrier 38 (see FIG. 1) towards the zero line 63 (see FIG. 2) in the −X direction at a fast feed rate as indicated by the line 65 in FIG. 2. This fast feed rate of the spindle carrier 38 (see FIG. 1) is ten inches per minute.

As the voltage output from the instrumentation amplifier 78 (see FIG. 5) of the precision amplifiers 76 decreases as the spindle carrier 38 (see FIG. 1) moves in the −X direction of FIG. 2 towards the zero line 63, the negative going voltage reaches zero just prior to the axis 43 (see FIG. 1) of the spindle 42 of the spindle carrier 38 of the machine tool 12 becoming aligned with the axis 26 of the spindle 25 of the spindle carrier 21 of the machine tool 10 at the zero line 63 (see FIG. 2). Because of the fast feed rate, the axis 43 (see FIG. 1) of the spindle 42 of the spindle carrier 38 of the machine tool 12 coasts past alignment in the X-plane with the axis 26 of the spindle 25 of the spindle carrier 21 of the machine tool 10 after the motive means for the saddle 32 is inactivated by the high output from the zero detector 64 (see FIG. 5).

This detection of the negative going voltage output of the instrumentation amplifier 78 reaching zero by the level detector and latch 99 is supplied as a high from the OR circuit 101 by the conductor 107 to an OR circuit 112 (see FIG. 8) of the power supply board 96. The output from the OR circuit 112 is supplied to an output pulse timer 113 to simultaneously activate the drivers 95. One suitable example of the output pulse timer 113 (see FIG. 10) is a CMOS monostable multivibrator sold by Motorola as model MC14538B.

The OR circuit 112 includes an inverter 115 connected to the output of the zero detector 64 (see FIG. 4) by the conductor 107 (see FIG. 10) and an inverter 116 connected by a conductor 117 to the output of the zero detector 69 (see FIG. 4). Each of the inverters 115 (see FIG. 10) and 116 is connected through diodes 118 and 119, respectively, to an inverter 120.

The drivers 95 include an inverter 121 having its input connected to $\overline{Q}$ output of the output pulse timer 113 and its output connected to the conductor 97 to provide the SET signal. Thus, when the output pulse driver 113 has a low at its $\overline{Q}$ output, there is a high SET signal on the conductor 97.

The drivers 95 include an inverter 122 having its input connected to Q output of the output pulse timer 113. The output of the inverter 122 is applied to the base of an NPN transistor 123 having its collector connected to the CNC 59 (see FIG. 13) through a conductor 124 (see FIG. 10) and its emitter grounded.

The drivers 95 include an inverter 124' having its input connected to the Q output of the output pulse timer 113 and its output connected to a conductor 125. Thus, when the zero detector 64 (see FIG. 4) or 69 produces a high output, the Q output of the output pulse timer 113 (see FIG. 10) is high so that the conductor 125 has a low thereon and the conductor 124 supplies a high output to the base software of the CNC 59 (see FIG. 13).

One suitable example of the inverters 115 (see FIG. 10), 116, 120–122, and 124' is a CMOS inverter buffer sold by Motorola as model MC14049B. One suitable example of the transistor 123 is a 2N4401 transistor.

Upon receipt of the high signal, the base software of the CNC 59 (see FIG. 13) causes retraction of the spindle carrier 38 (see FIG. 1) in the +X direction of FIG. 2 at a rapid rate. This direction of motion is indicated by the line 66 in FIG. 2.

This retraction of the spindle carrier 38 (see FIG. 1) is a lesser distance than that during initial movement in the +X direction of FIG. 2. However, it is greater than that required to again cause activation of the zero detector 64 (see FIG. 5).

The zero detector 64 is inactivated by the output from one of the drivers 95 (see FIG. 8) of the power supply board 96 over the conductor 97. This supplies a high SET signal to one of the two inputs of the NOR gate 94 (see FIG. 7) of the reset circuit 80.

When the high SET signal is received at the NOR gate 94, the output of the NOR gate 94 goes low so that the output of the inverter 98 goes high. This high input at the NOR gate 89 from the output of the inverter 98 causes the output of the NOR gate 89 to go low whereby the output of the NOR gate 90 goes high.

The high output from the NOR gate 90 is supplied as an input to the NOR gate 91 to cause the output of the NOR gate 91 to go low. This results in the RESET signal on the conductor 93 from the output of the NOR gate 92 going high.

The output of the NOR gate 89 also is an input to the NOR gate 88. Since the output of the operational amplifier 83 changed state when the output from the operational amplifier 82 dropped so that the voltage level at the negative input became greater, the NOR gate 88 has two low inputs so that its output goes high. Thus, the NOR gates 88 and 89 stay in this locked state until the operational amplifier 83 again has a high output.

This prevents any further low RESET signal from the reset circuit 80 of the arm and reset circuit 73 (see FIG. 5) over the conductor 93 to the level detector and latch 99 and the level detector and latch 100 until the spindle carrier 38 (see FIG. 1) is again moving in the +X direction of FIG. 2 from the zero line 63. Thus, the zero detector 64 (see FIG. 5) is inactivated until another of the low RESET signals is supplied over the conductor 93.

As previously mentioned, one of the drivers 95 (see FIG. 8) supplies a low signal over the conductor 125 when the laser beam 48 (see FIG. 1) is aligned with the laser target 49. The conductor 125 is connected to an audible signal warning device 126 (see FIG. 4) of the power supply board 96. One suitable example of the device 126 is an audible signal warning device sold by Mallory Components Division, Indianapolis, Ind. as model SC628A. The device 126 provides an audible signal that the spindle carrier 38 (see FIG. 1) has reached the zero line 63 (see FIG. 2) while moving in the −X direction.

After the base software of the CNC 59 (see FIG. 13) receives the low signal over the conductor 124 (see FIG. 8), the base software of the CNC 59 (see FIG. 13) causes rapid motion in the +X direction of FIG. 2 of the spindle carrier 38 (see FIG. 1) to the third selected distance greater than the second selected distance at which the zero detector 64 (see FIG. 5) is again activated. The activation occurs in the same manner as previously described for movement of the spindle carrier 38 (see FIG. 1) in the +X direction prior to moving at the fast feed rate in the −X direction as indicated by the line 65.

After the spindle carrier 38 (see FIG. 1) has been moved in the +X direction of FIG. 2 the third selected distance under control of the base software of the CNC 59 (see FIG. 13), the base software of the CNC 59 stops the movement of the spindle carrier 38 (see FIG. 1). Then, the base software of the CNC 59 (see FIG. 13) causes the spindle carrier 38 (see FIG. 1) to be moved as indicated by the line 67 (see FIG. 2) in the −X direction towards the zero line 63 at the slow feed rate of one-half inch per minute.

At this slow feed rate, the level detector and latch 99 (see FIG. 5) of the zero detector 64 supplies a signal through the OR circuit 101 to the conductor 107 when the output of the operational amplifier 78 of the precision amplifiers 76 has a negative going signal go to zero. Because of the slow feed rate of the spindle carrier 38 (see FIG. 1), the stopping of the motive means for the spindle carrier 38 upon receipt of the signal from the level detector and latch 99 (see FIG. 5) at the base software of the CNC 59 (see FIG. 13) results in the spindle carrier 38 (see FIG. 1) stopping so that the axis 43 of the spindle 42 of the spindle carrier 38 of the machine tool 12 is in alignment in the X-plane with the axis 26 of the spindle 25 of the spindle carrier 21 of the machine tool 10. This also aligns the longitudinal axes of the cutting tools 27 and 44 in the X-plane.

Then, the G77 canned cycle in the numerical control part program of the CNC 59 (see FIG. 13) is released. Thus, the alignment in the X-plane is completed.

When the base software of the CNC 59 supplied a high signal over the conductor 70 (see FIG. 7) to the arming circuit 72 of the arm and reset circuit 73, the base software of the CNC 59 (see FIG. 13) also supplied a low signal over a conductor 127 (see FIG. 4). This caused energization of a light 128, which also is connected to +24 volts from the CNC 59 (see FIG. 13), to indicate that the base software of the CNC 59 has selected the alignment to be in the X-plane.

When the low RESET signal is supplied over the conductor 93 (see FIG. 7), a high signal is supplied over a conductor 129 because of the RESET signal on the conductor 93 being inverted by an inverter 130, which is the same as the inverters 85 and 98 of the reset circuit 80. This high signal on the conductor 129 is supplied to a light driver 131 (see FIG. 11) of the power supply board 96. The light driver 131, which is an NPN transistor and the same as the transistor 123 (see FIG. 10), turns on so that a light 132 (see FIG. 4), which is connected by a conductor 133 to the light driver 131 (see FIG. 11), is energized by the +24 volts. Thus, the lights 128 (see FIG. 4) and 132 must both be energized for there to be any sensing of crossing of the zero line 63 (see FIG. 2) when there is alignment in the X-plane of the axis 43 (see FIG. 1) of the spindle 42 of the spindle carrier 38 of the machine tool 12 with the axis 26 of the spindle 25 of the spindle carrier 21 of the machine tool 10.

The power supply board 96 (see FIG. 8) also includes an isolation and radio frequency interference (RFI) filter 135 connected to an AC source and a power supply circuit 136 having its input connected to the output of the filter 135. The power supply circuit 136 has three outputs of +15 V, −15 V, and common as shown in FIG. 9.

The isolation and RFI filter 135 includes an RFI filter 137 having three inputs of +115 volts AC, −115 volts AC, and earth ground. The RFI filter 137 has two outputs to a transformer 138, which is part of the isolation and RFI filter 135.

One suitable example of the filter 137 is an RFI filter sold by Corom Inc., Libertyville, Ill. as model 3EP3. One suitable example of the transformer 138 is a transformer sold by Signal Transformer, Inwood, N.Y. as model DST5-120. One suitable example of the power supply circuit 136 is a power supply sold by Burr-Brown Corporation, Columbus, Ohio as model 553. The power supply circuit 136 supplies +15 volts and −15 volts to instrument circuits of the zero detectors 64 (see FIG. 4) and 69 and the power supply circuit 136 (see FIG. 8) also supplies +15 volts and −15 volts to logic circuits of the zero detectors 64 (see FIG. 4) and 69.

After the axis 43 (see FIG. 1) of the spindle 42 of the spindle carrier 38 of the machine tool 12 has been aligned with the axis 26 of the spindle 25 of the spindle carrier 21 of the machine tool 10 in the X-plane, it is necessary to align the axis 43 of the spindle 42 of the spindle carrier 38 of the machine tool 12 with the axis 26 of the spindle 25 of the spindle carrier 21 of the machine tool 10 in the Y-plane. This is accomplished through movement of the spindle carrier 38 along the Y-axis 41 in both the +Y and −Y directions of FIG. 2 with respect to the zero line 68 with the zero detector 69 (see FIG. 3) receiving an input from the readout 55 through a conductor 139.

In the same manner as described for alignment in the X-plane, the alignment in the Y-plane results in a light 140 (see FIG. 4) being energized from the base software of the CNC 59 (see FIG. 13) by a low signal on a conductor 141 (see FIG. 4) when alignment is to occur in the Y-plane. Each time that the Y-axis zero detector 69 is activated, a light 142 is energized from a light driver 143 (see FIG. 11), which is the same as the light driver 131, through a conductor 144 in the same manner as the light 132 (see FIG. 4) is energized during alignment in the X-plane. Thus, the light driver 143 (see FIG. 11) is activated from the zero detector 69 (see FIG. 4) through a conductor 145 having a high when a low RESET signal is produced by the reset circuit of the zero detector 69.

The same operations occur in the Y-plane as in the X-plane insofar as the CNC 59 controlling various operations. The output from the zero detector 69 (see FIG. 4) for the alignment in the Y-axis is supplied to the OR circuit 112 (see FIG. 8) over the conductor 117.

When the alignment in the Y-plane is completed, the MSC of the CNC 59 (see FIG. 13) signals the PLC 62 that such has occurred. Then, the PLC 62 transmits an output signal through the serial network line 60 to the PLC 61 from which an output signal is transmitted as an input to the MSC software of the CNC 58. At this time, the MSC of the CNC 58 releases control to the base software of the CNC 58 to continue the rest of the numerical control part program of the CNC 58.

The resistances in ohms of the various resistors in FIG. 6 are as follows:

| R5 | 4,700 |
|---|---|
| R6, R7, R9, R19, R31, R32, and R34 | 10,000 |
| R8 and R15 | 22,000 |
| R17 | 100,000 |
| R18 | 1,210 |
| R23 | 4,640. |

The capacitances in microfarads of the various capacitors in FIG. 6 are as follows:

| C3, C8, C9, and C11 | 0.1 |
|---|---|
| C18 and C19 | 0.001 |
| C20 | 0.033. |

The maximum resistances in ohms of the potentiometers in FIG. 6 are as follows:

| P2 | 2,000 |
|---|---|
| P3 | 100,000. |

Figure 7:
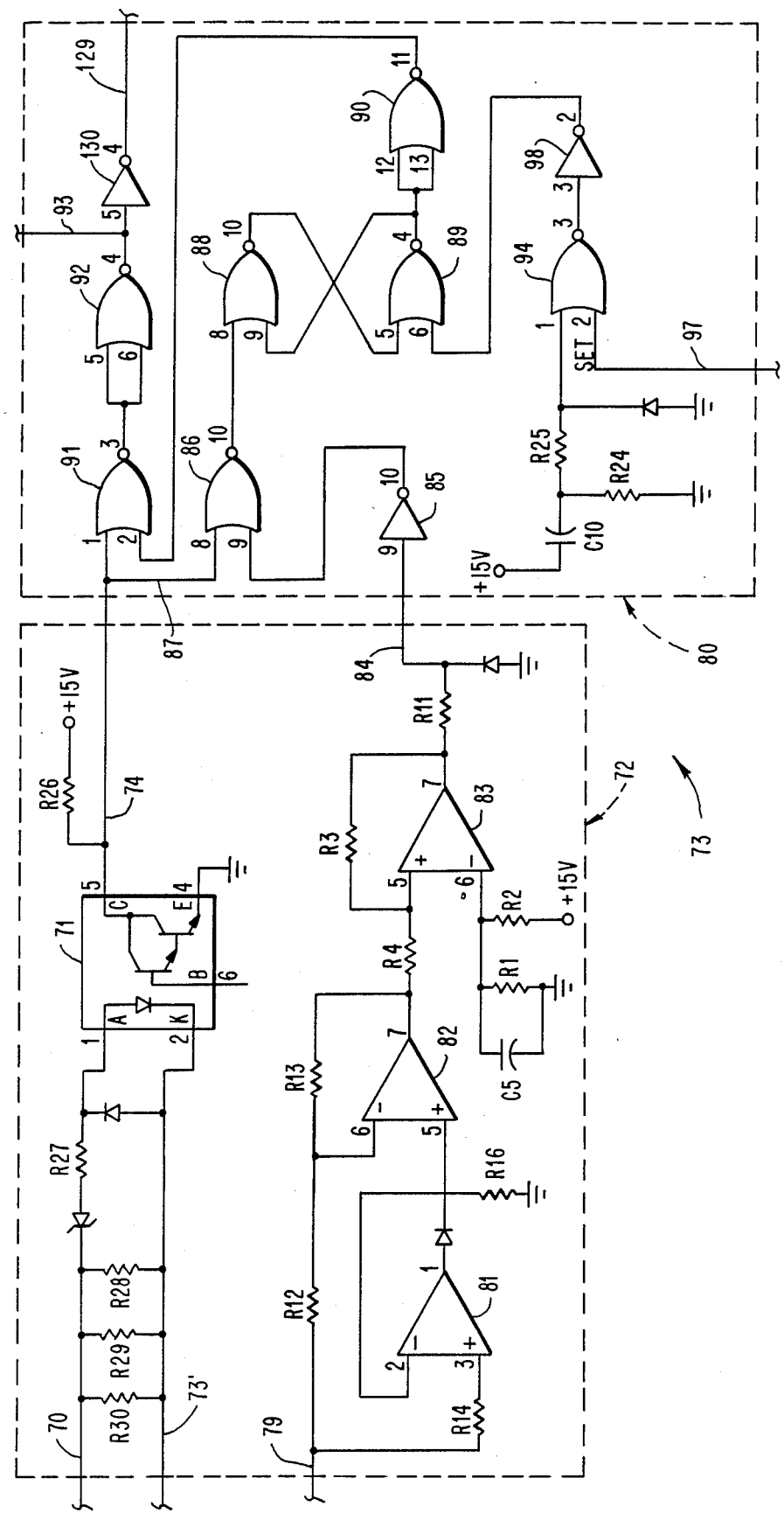
FIG. 7 is an electrical circuit diagram of an arming circuit and a reset circuit of an arm and reset circuit of the zero detector of FIG. 5.

The resistances in ohms of the various resistors in FIG. 7 are as follows:

| R1, R4, and R27 | 1,000 |
|---|---|
| R2 | 4,640 |
| R3 | 470,000 |
| R11 | 22,000 |
| R12, R13, R14, R25, and R26 | 10,000 |
| R16 | 4,700 |
| R24 | 47,000 |
| R28, R29, and R30 | 3,300. |

The capacitance in microfarads of the various capacitors in FIG. 7 are as follows:

| C5 | 0.1 |
|---|---|
| C10 | 10. |

The resistance in ohms of the various resistors in FIG. 10 are as follows:

| R2 | 330 |
|---|---|
| R3, R4, and R5 | 4,700 |
| R6 | 150,000 |
| R9 and R10 | 22,000. |

The capacitance of the capactior C5 in FIG. 10 is 2.2 microfarads.

The resistance of each of resistors R7 and R8 in FIG. 11 is 4,700 ohms.

While the invention has been described with respect to alignment in two orthogonal planes, it should be understood that the apparatus of the present invention could be utilized for aligment only in a single plane. For example, if the base 13 (see FIG. 1) of the machine tool 10 and the base 31 of the machine tool 12 were a single base and such could be possible depending on the location of the part 29 (See FIG. 12) in the part-fixture area 11 (see FIG. 1), there would only be movement in the Y-plane for alignment purposes since there would be no motion of the spindle carrier 21 along the X-axis 34 or vice versa. Instead, both of the spindle carriers 21 and 38 would move along the X-axes 17 and 34, respectively, simultaneously through the single base. Thus, this would constitute a single machine tool.

While the axis 43 of the spindle 42 of the spindle carrier 38 of the machine tool 12 and the axis 26 of the spindle 25 of the spindle carrier 21 of the machine tool 10 have been shown and described as being disposed horizontally, it should be understood that they could be disposed vertically if desired. Thus, the method and apparatus of the present invention can be utilized to align the axis 43 of the spindle 42 of the spindle carrier 38 of the machine tool 12 with the axis 26 of the spindle 25 of the spindle carrier 21 of the machine tool 10 irrespective of the plane relative to the horizontal in which the axes 26 and 43 are disposed.

While the cutting tools 27 and 44 have been described for forming the bore holes 28 (see FIG. 12) and 45 in the part 29, it should be understood that the cutting tools 27 (see FIG. 1) and 44 may be any desired cutting tool capable of performing the cutting operation for a part such as the part 29 (see FIG. 12), for example, in which it is desired that there be precise alignment of the cutting tools 27 (see FIG. 1) and 44 at the start of a specific cutting operation.

The laser 46 is preferably mounted on the spindle carrier 21 and the target 49 is preferably mounted on the spindle carrier 38 because this minimizes any vibration or jitter of the laser beam 48 during alignment. This is because the spindle carrier 21, which supports the laser 46, is stationary during the alignment. However, if desired, the laser 46 could be mounted on the spindle carrier 38 and the target 49 on the spindle carrier 21, but there would be some vibration or jitter of the laser beam 48. This would require filtering the output from the readout 55 (see FIG. 3) prior to its supply to the zero detector 64 or 69. This would necessitate the zero detector 64 or 69 producing the high signal on the conductor 107 (see FIG. 8) or 117 earlier.

While the present invention has shown and described the alignment of the axis 43 (see FIG. 1) of the spindle 42 of the spindle carrier 38 of the machine tool 12 with the axis 26 of the spindle 25 of the spindle carrier 21 of the machine tool 10 being accomplished through the use of the laser beam 48 from the laser 46 to the target 49, it should be understood that any other suitable light producing means could be employed. For example, any light source having a sharp focus could be employed rather than the laser 46, the laser beam 48, and the laser target 49.

While the alignment of the axis 43 of the spindle 42 of the spindle carrier 38 of the machine tool 12 with the axis 26 of the spindle 25 of the spindle carrier 21 of the machine tool 10 has been described with respect to two motions of the spindle carrier 38 in the −X direction of FIG. 2 (identified by the lines 65 and 67) relative to the zero line 63 and two movements in the −Y direction relative to the zero line 68, it should be understood that such is not a requisite for satisfactory operation in that a single motion in the −X and −Y directions could be employed. While it would take longer, there could be only the single motion in the −X direction along the line 65 after having moved 0.150″ in the +X direction with the feed rate in the −X direction along the line 65 being at the very slow feed rate. Because it is necessary to be certain that the zero detector 64 (see FIG. 4) is activated during the movement in the +X direction of FIG. 2, the spindle carrier 38 (see FIG. 1) must travel a substantial distance since the exact location of the axis 43 of the spindle 42 of the spindle carrier 38 of the machine tool 12 with respect to the zero line 63 (see FIG. 2) at the start of the alignment cycle is not known. This also is applicable to the alignment in the Y-plane.

An advantage of this invention is that it eliminates misalignment between two spindles that are forming aligned bore holes on opposite sides of a part.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. A method of forming aligned bore holes in opposite side walls of a part by two separate cutting tools mounted in two separate spindle carriers adjacent the opposite side walls of the part including:

positioning one of the two separate cutting tools on one of the two separate spindle carriers at a position at which it is to form a bore hole in one of the opposite side walls so that the longitudinal axis of the one cutting tool is aligned with the location of the center of the bore hole to be formed in the one side wall;

positioning the other of the two separate spindle carriers having the other of the two separate cutting tools at a position adjacent a zero point at which light producing means on a first of the two separate spindle carriers is aligned with light target means on a second of the two separate spindle carriers along an axis parallel to the longitudinal axes of the one cutting tool and the other cutting tool;

moving the other spindle carrier in one direction along a first axis perpendicular to the longitudinal axes of the one cutting tool and the other cutting tool from the position adjacent the zero point;

activating detector means that detects when the one of the light producing means and the light target means on the other spindle carrier is at a predetermined position prior to the zero point when the other spindle carrier is moving in the opposite direction along the first axis with activation of the detector means occurring when the other spindle carrier is at a selected distance past the zero point during movement of the other spindle carrier in the one direction along the first axis;

moving the other spindle carrier in the opposite direction along the first axis after the other spindle carrier has moved at least the selected distance past the zero point in the one direction along the first axis with a feed rate that will provide momentum to the other spindle carrier to cause it to stop with the one of the light producing means and the light target means on the other spindle carrier at the zero point when feeding of the other spindle carrier is stopped at the predetermined position prior to the zero point;

and stopping feeding of the other spindle carrier in the opposite direction along the first axis in response to a signal from the detector means detecting that the one of the light producing means and the light target means on the other spindle carrier is at the predetermined position prior to the zero point so that the one of the light producing means and the light target means on the other spindle carrier stops at the zero point whereby the other cutting tool has its longitudinal axis aligned with the longitudinal axis of the one cutting tool in a plane containing the first axis.

2. The method according to claim 1 including:

moving the other spindle carrier in one direction along a second axis perpendicular to the first axis and to the longitudinal axes of the one cutting tool and the other cutting tool from a position adjacent the zero point in a plane containing the second axis after completion of alignment of the longitudinal axes of the one cutting tool and the other cutting tool in a plane containing the first axis;

activating detector means that detects when the one of the light producing means and the light target means on the other spindle carrier is at a predetermined position prior to the zero point when the other spindle carrier is moving in the opposite direction along the second axis with activation of the detector means occurring when the other spindle carrier is at a selected distance past the zero point during movement of the other spindle carrier in the one direction along the second axis;

moving the other spindle carrier in the opposite direction along the second axis after the other spindle carrier has moved at least the selected distance past the zero point in the one direction along the second axis with a feed rate that will provide momentum to the other spindle carrier to cause it to stop with the one of the light producing means and the light target means on the other spindle carrier at the zero point when feeding of the other spindle carrier is stopped at the predetermined position prior to the zero point;

and stopping feeding of the other spindle carrier in the opposite direction along the second axis in response to a signal from the detector means detecting that the one of the light producing means and the light target means on the other spindle carrier is at the predetermined position prior to the zero point so that the one of the light producing means and the light target means on the other spindle carrier stops at the zero point whereby the other cutting tool has its longitudinal axis aligned with the longitudinal axis of the one cutting tool in a plane containing the second axis.

3. The method according to claim 2 in which the first spindle carrier is the one spindle carrier and the second spindle carrier is the other spindle carrier.

4. The method according to claim 1 in which the first spindle carrier is the one spindle carrier and the second spindle carrier is the other spindle carrier.

5. A method of forming aligned bore holes in opposite side walls of a part by two separate cutting tools mounted in two separate spindle carriers adjacent the opposite side walls of the part including:

positioning one of the two separate cutting tools on one of the two separate spindle carriers at a position at which it is to form a bore hole in one of the opposite side walls so that the longitudinal axis of the one cutting tool is aligned with the location of the center of the bore hole to be formed in the one side wall;

positioning the other of the two separate spindle carriers having the other of the two separate cutting tools at a position adjacent a zero point at which a laser on a first of the two separate spindle carriers is aligned with a laser target on a second of the two separate spindle carriers along an axis parallel to the longitudinal axes of the one cutting tool and the other cutting tool;

moving the other spindle carrier in one direction along a first axis perpendicular to the longitudinal axes of the one cutting tool and the other cutting tool from the position adjacent the zero point;

activating detector means that detects when the one of the laser and the laser target on the other spindle carrier is at a predetermined position prior to the zero point when the other spindle carrier is moving in the opposite direction along the first axis with activation of the detector means occurring when the other spindle carrier is at a selected distance past the zero point during movement of the other spindle carrier in the one direction along the first axis;

moving the other spindle carrier in the opposite direction along the first axis at a first feed rate after the other spindle carrier has moved at least the selected distance past the zero point in the one direction along the first axis;

stopping movement of the other spindle carrier in the opposite direction adjacent the zero point in response to a signal from the detector means detecting that the one of the laser and the laser target on the other spindle carrier is at the predetermined position prior to the zero point;

moving the other spindle carrier in the one direction along the first axis from its stopped position adjacent the zero point past the zero point sufficiently to activate the detector means again;

activating the detector means again when the other spindle carrier has moved the selected distance past the zero point in the one direction along the first axis;

moving the other spindle carrier in the opposite direction along the first axis at a second feed rate substantially less than the first feed rate after the other spindle carrier has moved at least the selected distance past the zero point in the one direction along the first axis with the second feed rate providing momentum to the other spindle carrier to cause it to stop with the one of the laser and the laser target on the other spindle carrier at the zero point when feeding of the other spindle carrier is stopped at the predetermined position prior to the zero point;

and stopping feeding of the other spindle carrier in the opposite direction along the first axis in response to a signal from the detector means detecting that the one of the laser and the laser target on the other spindle carrier is at the predetermined position prior to the zero point so that the one of the laser and the laser target on the other spindle carrier stops at the zero point whereby the other cutting tool has its longitudinal axis aligned with the longitudinal axis of the one cutting tool in a plane containing the first axis.

6. The method according to claim 5 including:

moving the other spindle carrier in one direction along a second axis perpendicular to the first axis and to the longitudinal axes of the one cutting tool and the other cutting tool from a position adjacent the zero point in a plane containing the second axis after completion of alignment of the longitudinal axes of the one cutting tool and the other cutting tool in a plane containing the first axis;

activating detector means that detects when the one of the laser and the laser target on the other spindle carrier is at a predetermined position prior to the zero point when the other spindle carrier is moving in the opposite direction along the second axis with activation of the detector means occurring when the other spindle carrier is at a selected distance past the zero point during movement of the other spindle carrier in the one direction along the second axis;

moving the other spindle carrier in the opposite direction along the second axis at a first feed rate after the other spindle carrier has moved at least the selected distance past the zero point in the one direction along the second axis;

stopping movement of the other spindle carrier in the opposite direction adjacent the zero point in response to a signal from the detector means detecting that the one of the laser and the laser target on the other spindle carrier is at the predetermined position prior to the zero point;

moving the other spindle carrier in the one direction along the second axis from its stopped position adjacent the zero point past the zero point sufficiently to activate the detector means again;

activating the detector means again when the other spindle carrier has moved the selected distance past the zero point in the one direction along the second axis;

moving the other spindle carrier in the opposite direction along the second axis at a second feed rate substantially less than the first feed rate after the other spindle carrier has moved at least the selected distance in the one direction along the second axis with the second feed rate providing momentum to the other spindle carrier to cause it to stop with the one of the laser and the laser target on the other spindle carrier at the zero point when feeding of the other spindle carrier is stopped at the predetermined position prior to the zero point;

and stopping feeding of the other spindle carrier in the opposite direction along the second axis in response to a signal from the detector means detecting that the one of the laser and the laser target on the other spindle carrier is at the predetermined position prior to the zero point so that the one of the laser and the laser target on the other spindle carrier stops at the zero point whereby the other cutting tool has its longitudinal axis aligned with the longitudinal axis of the one cutting tool in a plane containing the second axis.

7. The method according to claim 6 in which the first spindle carrier is the one spindle carrier and the second spindle carrier is the other spindle carrier.

8. The method according to claim 5 in which the first spindle carrier is the one spindle carrier and the second spindle carrier is the other spindle carrier.

9. An apparatus for forming aligned bore holes or the like in opposite side walls of a part including:

a first spindle carrier having a first cutting tool disposed adjacent one of the opposite side walls of the part for forming a bore hole or the like therein;

a second spindle carrier having a second cutting tool disposed adjacent the other of the opposite side walls of the part for forming a bore hole or the like therein in alignment with the bore hole formed in the one side wall by said first cutting tool;

one of said first spindle carrier and said second spindle carrier having light producing means mounted thereon for producing a focused light along a first axis substantially parallel to the longitudinal axes of said first cutting tool and said second cutting tool;

the other of said first spindle carrier and said second spindle carrier having light target means for receiving the focused light from said light producing means;

said first spindle carrier being disposed at a position at which a bore hole or the like is to be formed in the one side wall in alignment with a bore hole or the like in the other side wall so that the longitudinal axis of said first cutting tool is aligned with the location of the center of the bore hole to be formed in the side wall;

said second spindle carrier being movable along a second axis perpendicular to the first axis and to the longitudinal axes of said first cutting tool and said second cutting tool for disposition at a position at which a bore hole or the like is to be formed in the other side wall in alignment with a bore hole or the like in the one side wall;

first determining means for determining when the longitudinal axis of said second cutting tool is aligned with the longitudinal axis of said first cutting tool during movement of said second spindle carrier along the second axis through said light producing means being aligned with said light target means along the first axis in a plane containing the second axis, said first determining means being energized when said second spindle carrier moves a selected distance in one direction along the second axis past a selected position at which said light producing means and said light target means are aligned along the first axis in a plane containing the second axis;

and said first determining means causing said second spindle carrier to stop with the longitudinal axis of said second cutting tool aligned with the longitudinal axis of said first cutting tool in a plane containing the second axis when said second spindle carrier moves in the opposite direction along the second axis at a selected feed rate after being moved at least the selected distance past the selected position in the one direction along the second axis.

10. The apparatus according to claim 9 including:
said second spindle carrier being movable along a third axis perpendicular to the first and second axes and to the longitudinal axes of said first cutting tool and said second cutting tool for disposition at a position at which the bore hole is to be formed in the other side wall in alignment with the bore hole in the one side wall;

second determining means for determining when the longitudinal axis of said second cutting tool is aligned with the longitudinal axis of said first cutting tool during movement of said second spindle carrier along the third axis through said light producing means being aligned with said light target means along the first axis in a plane containing the third axis, said second determining means being energized when said second spindle carrier moves a selected distance in one direction along the third axis past a selected position at which said light producing means and said light target means are aligned along the first axis in a plane containing the third axis;

and said second determining means causing said second spindle carrier to stop with the longitudinal axis of said second cutting tool aligned with the longitudinal axis of said first cutting tool in a plane containing the third axis when said second spindle carrier moves in the opposite direction along the third axis at a selected feed rate after being moved at least the selected distance past the selected position in the one direction along the third axis.

11. The apparatus according to claim 10 in which:
said first determining means includes means to produce a signal when said second spindle carrier is at a predetermined distance from the selected position during movement in the opposite direction along the second axis to stop feeding of said second spindle carrier so that the momentum of said second spindle carrier causes said second spindle carrier to stop with the longitudinal axis of said second cutting tool aligned with the longitudinal axis of said first cutting tool when said second spindle carrier is moving in the opposite direction along the second axis;

and said second determining means includes means to produce a signal when said second spindle carrier is at a predetermined distance from the selected position during movement in the opposite direction along the third axis to stop feeding of said second spindle carrier so that the momentum of said second spindle carrier causes said second spindle carrier to stop with the longitudinal axis of said second cutting tool aligned with the longitudinal axis of said first cutting tool when said second spindle carrier is moving in the opposite direction along the third axis.

12. The apparatus according to claim 11 in which said light producing means is mounted on said first spindle carrier and said light target means is mounted on said second spindle carrier.

13. The apparatus according to claim 10 in which said light producing means is mounted on said first spindle carrier and said light target means is mounted on said second spindle carrier.

14. The apparatus according to claim 9 in which said first determining means includes means to produce a signal when said second spindle carrier is at a predetermined distance from the selected position during movement in the opposite direction along the second axis to stop feeding of said second spindle carrier so that the momentum of said second spindle carrier causes said second spindle carrier to stop with the longitudinal axis of said second cutting tool aligned with the longitudinal axis of said first cutting tool when said second spindle carrier is moving in the opposite direction along the second axis.

15. The apparatus according to claim 14 in which said light producing means is mounted on said first spindle carrier and said light target means is mounted on said second spindle carrier.

16. The apparatus according to claim 9 in which said light producing means is mounted on said first spindle carrier and said light target means is mounted on said second spindle carrier.

17. An apparatus for forming aligned bore holes or the like in opposite side walls of a part including:
- a first spindle carrier having a first cutting tool disposed adjacent one of the opposite side walls of the part for forming a bore hole or the like therein;
- a second spindle carrier having a second cutting tool disposed adjacent the other of the opposite side walls of the part for forming a bore hole or the like therein in alignment with the bore hole formed in the one side wall by said first cutting tool;
- one of said first spindle carrier and said second spindle carrier having laser means mounted thereon for producing a laser beam along a first axis substantially parallel to the longitudinal axes of said first cutting tool and said second cutting tool;
- the other of said first spindle carrier and said second spindle carrier having laser target means for receiving the laser beam from said laser means;
- said first spindle carrier being disposed at a position at which a bore hole or the like is to be formed in the one side wall in alignment with a bore hole or the like in the other side wall so that the longitudinal axis of said first cutting tool is aligned with the location of the center of the bore hole to be formed in the one side wall;
- said second spindle carrier being movable along a second axis perpendicular to the first axis and to the longitudinal axes of said first cutting tool and said second cutting tool for disposition at a position at which a bore hole or the like is to be formed in the other side wall in alignment with a bore hole or the like in the one side wall;
- first producing means for producing an electrical signal indicative of the amount of non-alignment of the laser beam from said laser means with said laser target means in a plane containing the second axis;
- first detecting means responsive to the electrical signal from said first producing means for detecting when the laser beam from said laser means is aligned with said laser target means in a plane containing the second axis so that the longitudinal axis of said second cutting tool is aligned with the longitudinal axis of said first cutting tool during movement of said second spindle carrier along the second axis, said first detecting means being energized when said second spindle carrier moves a selected distance in one direction along the second axis past a zero point at which the laser beam from said laser means is aligned with said laser target means;
- and said first detecting means causing said second spindle carrier to stop with the longitudinal axis of said second cutting tool aligned with the longitudinal axis of said first cutting tool in a plane containing the second axis when said second spindle carrier moves in the opposite direction along the second axis at a selected feed rate after being moved at least the selected distance past the zero point in the one direction along the second axis.

18. The apparatus according to claim 17 including:
- said second spindle carrier being moved along a third axis perpendicular to each of the first and second axes and to the longitudinal axes of said first cutting tool and said second cutting tool for disposition at a position at which a bore hole or the like is to be formed in the other side wall in alignment with a bore hole or the like in the one side wall by said first cutting tool;
- second producing means for producing an electrical signal indicative of the amount of non-alignment of the laser beam from said laser means with said laser target means in a plane containing the third axis;
- second detecting means responsive to the electrical signal from said second producing means for detecting when the laser beam from said laser means is aligned with said laser target means in a plane containing the third axis so that the longitudinal axis of said second cutting tool is aligned with the longitudinal axis of said first cutting tool during movement of said second spindle carrier along the third axis, said second detecting means being energized when said second spindle carrier moves a selected distance in one direction along the third axis past the zero point;
- and said second detecting means causing said second spindle carrier to stop with the longitudinal axis of said second cutting tool aligned with the longitudinal axis of said first cutting tool in a plane containing the third axis when said second spindle carrier moves in the opposite direction along the third axis at a selected feed rate after being moved at least the selected distance past the zero point in the one direction along the third axis.

19. The apparatus according to claim 18 in which said laser means is mounted on said first spindle carrier and said laser target means is mounted on said second spindle carrier.

20. The apparatus according to claim 19 in which said laser means is mounted on said first spindle carrier and said laser target means is mounted on said second spindle carrier.

* * * * *